US008775960B1

(12) United States Patent
Flores

(10) Patent No.: US 8,775,960 B1
(45) Date of Patent: Jul. 8, 2014

(54) SYSTEMS AND METHODS FOR GEOGRAPHIC MAPPING AND REVIEW

(75) Inventor: Dawn E. Flores, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1471 days.

(21) Appl. No.: 12/045,474

(22) Filed: Mar. 10, 2008

(51) Int. Cl.
G06F 3/048 (2013.01)
G06Q 40/00 (2012.01)

(52) U.S. Cl.
USPC ............................................. 715/771; 705/4

(58) Field of Classification Search
USPC ............................................. 705/4; 715/771
See application file for complete search history.

(56) References Cited

U.S. PATENT DOCUMENTS

| | | | |
|---|---|---|---|
| 5,897,619 A | 4/1999 | Hargrove, Jr. et al. | |
| 6,301,563 B1 | 10/2001 | Brown et al. | |
| 6,633,312 B1 | 10/2003 | Rochford et al. | |
| 6,901,403 B1* | 5/2005 | Bata et al. .............................. | 1/1 |
| 7,240,292 B2* | 7/2007 | Hally et al. .................... | 715/778 |
| 7,249,006 B2 | 7/2007 | Lombardo et al. | |
| 2002/0069215 A1 | 6/2002 | Orbanes et al. | |
| 2002/0154177 A1* | 10/2002 | Barksdale et al. ............ | 345/853 |
| 2002/0173980 A1 | 11/2002 | Daggett et al. | |
| 2003/0007000 A1 | 1/2003 | Carlson et al. | |
| 2003/0009239 A1 | 1/2003 | Lombardo et al. | |
| 2003/0140064 A1 | 7/2003 | Klein | |
| 2004/0027258 A1 | 2/2004 | Pechatnikov et al. | |
| 2004/0044549 A1 | 3/2004 | Loop | |
| 2004/0117358 A1 | 6/2004 | von Kaenel et al. | |
| 2004/0119759 A1 | 6/2004 | Barros | |
| 2004/0260510 A1 | 12/2004 | Du | |
| 2005/0005242 A1* | 1/2005 | Hoyle ........................... | 715/745 |
| 2005/0034074 A1 | 2/2005 | Munson et al. | |
| 2005/0091223 A1 | 4/2005 | Shaw et al. | |
| 2005/0209770 A1 | 9/2005 | O'Neill et al. | |
| 2005/0240381 A1 | 10/2005 | Seiler et al. | |
| 2006/0010416 A1 | 1/2006 | Keck et al. | |
| 2006/0095647 A1* | 5/2006 | Battaglia et al. .............. | 711/100 |
| 2006/0100912 A1* | 5/2006 | Kumar et al. ...................... | 705/4 |
| 2006/0101328 A1 | 5/2006 | Albornoz et al. | |
| 2006/0136090 A1 | 6/2006 | Koromyslov et al. | |
| 2006/0136127 A1 | 6/2006 | Coch et al. | |
| 2006/0200383 A1 | 9/2006 | Arutunian et al. | |
| 2007/0016542 A1 | 1/2007 | Rosauer et al. | |
| 2007/0143019 A1 | 6/2007 | Feyen et al. | |
| 2007/0168370 A1 | 7/2007 | Hardy | |
| 2007/0203759 A1 | 8/2007 | Mathai et al. | |
| 2007/0214023 A1 | 9/2007 | Mathai et al. | |
| 2007/0225912 A1 | 9/2007 | Grush | |
| 2007/0282638 A1 | 12/2007 | Surovy | |

(Continued)

Primary Examiner — Boris Pesin
Assistant Examiner — Matthew Ell
(74) Attorney, Agent, or Firm — Fish & Richardson P.C.

(57) ABSTRACT

The present disclosure describes systems and methods for geographic mapping and review. One or more embodiments include a project template provided within a geographic information system (GIS) application, the project template associated with an actuarial review process and including: a number of selectable workspace pages configured to display a map content associated with a particular geographic region based on activation of one or more selectable map attributes associated with each of the number of selectable workspace pages; and a number of selectable layout pages configured to display the map content of a particular one of the number of selectable workspace pages along with other map information in a particular arrangement upon selection. One or more embodiments can include opening a project within the GIS application using the project template and preparing the project for actuarial review.

21 Claims, 13 Drawing Sheets

(56) References Cited

U.S. PATENT DOCUMENTS

| | | |
|---|---|---|
| 2007/0283046 A1* | 12/2007 | Dietrich et al. ............... 709/245 |
| 2008/0091461 A1 | 4/2008 | Evans et al. |
| 2008/0140628 A1 | 6/2008 | Ubalde et al. |
| 2009/0063694 A1* | 3/2009 | Foo et al. ...................... 709/231 |
| 2009/0150795 A1 | 6/2009 | Vargiya et al. |
| 2009/0313215 A1 | 12/2009 | Maizel et al. |
| 2011/0004840 A1* | 1/2011 | Feinberg et al. .............. 715/772 |

* cited by examiner

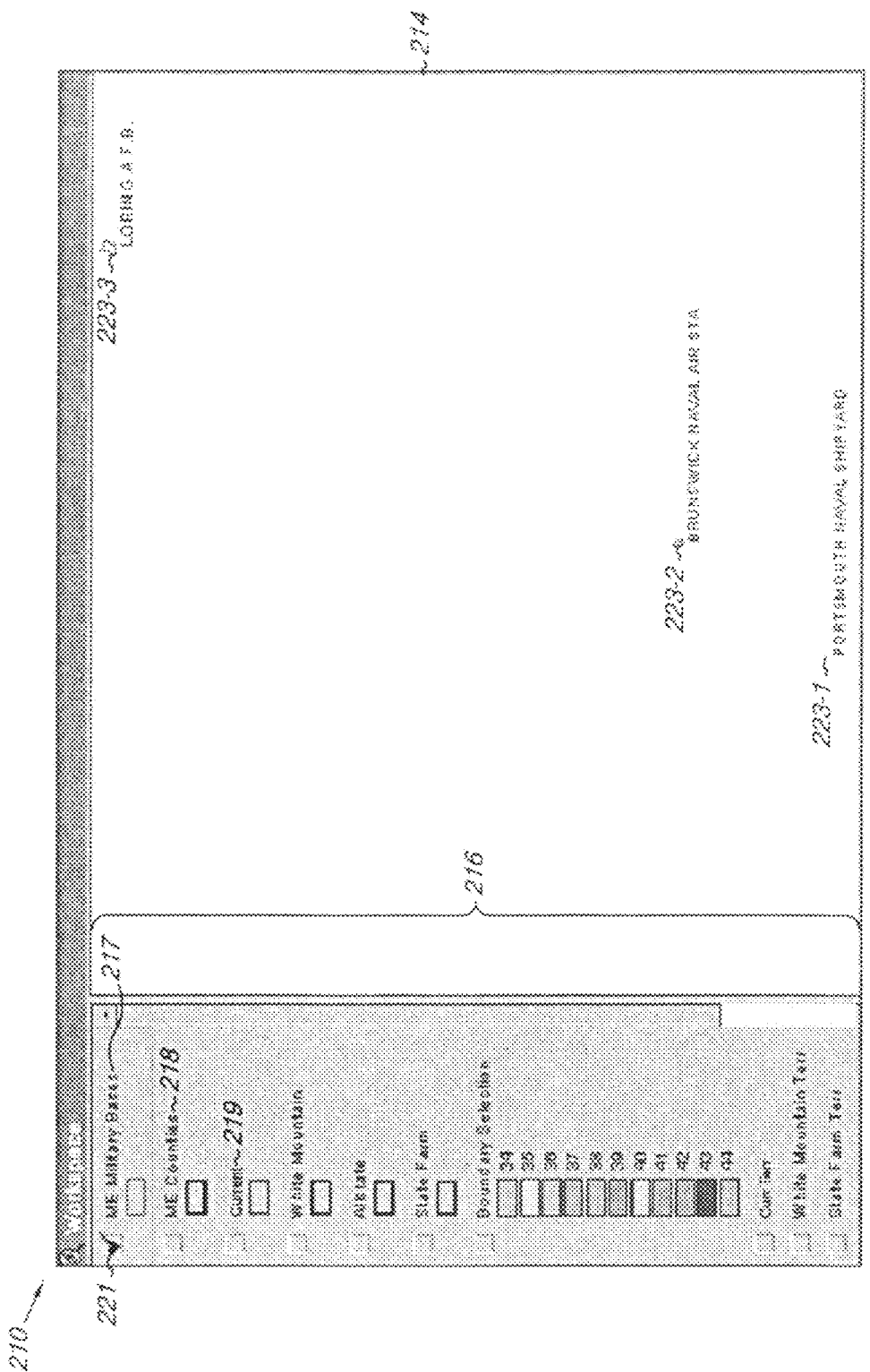

SYSTEMS AND METHODS FOR GEOGRAPHIC MAPPING AND REVIEW

CROSS REFERENCE TO RELATED APPLICATIONS

This application is related in subject matter to, and incorporates herein by reference in its entirety, each of the following: U.S. patent application entitled "Systems and Methods for Geographic Mapping and Review," bearing Ser. No. 12/045,550 (Applicant Reference No. US-0405.02), filed on the same date as this application; and U.S. patent application entitled "Systems and Methods for Geographic Mapping and Review," bearing Ser. No. 12/045,578 (Applicant Reference No. US-0405.03), also filed on the same date as this application.

BACKGROUND

Geographic information systems (GIS) can be used to collect, archive, modify, analyze, map, and display various types of geographically referenced data and information. Examples of GIS tools include GIS applications such as ArcView, ArcInfo, and ArcEditor provided by ESRI (Environmental Systems Research Institute), Inc., of Redlands, Calif.

In industries such as the insurance and financial industries, GIS applications can be useful for various purposes. For example, in the insurance industry, GIS applications can be used for actuarial review and/or evaluation of territorial boundaries associated with risk assessments and other factors that can influence insurance rates.

However, GIS applications can be manually intensive, slow, and inaccurate. For instance, many GIS applications may require operation by a specially trained individual. Even in cases in which an insurance company has access to a GIS operator, operation of the GIS application can still be a slow process, which can lead to extended time periods in order for completion of actuarial review processes.

In many instances, timelines for a review process can be imposed by a regulatory body, e.g., a State regulatory agency. Since operation of GIS applications can be slow, compliance with the imposed review timelines can be difficult, and accuracy of the information may suffer if insufficient time for GIS application processing is available.

SUMMARY

The present disclosure provides methods and systems for geographic mapping and review processes using a geographic information system (GIS) application.

One or more embodiments of the present disclosure provide a system for geographic mapping and review that includes: a project template provided within a geographic information system (GIS) application, the project template associated with an actuarial review process and including a number of selectable workspace pages configured to display a map content associated with a particular geographic region based on activation of one or more selectable map attributes associated with each of the number of selectable workspace pages and a number of selectable layout pages configured to display the map content of a particular one of the number of selectable workspace pages along with other map information in a particular arrangement upon selection; an initiation subsystem operable to open a project within the GIS application using the project template; and a preparation subsystem operable to prepare the project for actuarial review.

The disclosure also provides a method for geographic mapping and review that includes: providing a project template within a geographic information system (GIS) application, the project template associated with an actuarial review process and including a number of selectable workspace pages configured to display a map content associated with a particular geographic region based on activation of one or more selectable map attributes associated with each of the number of selectable workspace pages and a number of selectable layout pages configured to display the map content of a particular one of the number of selectable workspace pages along with other map information in a particular arrangement upon selection; opening a project within the GIS application using the project template; and preparing the project for actuarial review.

The disclosure further provides a computer readable medium having instructions stored thereon that can be executed by a computing device to: provide a project template within a geographic information system (GIS) application, the project template associated with an actuarial review process and including a number of selectable workspace pages configured to display a map content associated with a particular geographic region based on activation of one or more selectable map attributes associated with each of the number of selectable workspace pages and a number of selectable layout pages configured to display the map content of a particular one of the number of selectable workspace pages along with other map information in a particular arrangement upon selection; open a project within the GIS application using the project template; and prepare the project for actuarial review.

One or more embodiments of the present disclosure provide a system for geographic mapping and review that includes: a computing device configured to receive a request for an actuarial review of a particular geographic region; an operator of the computing device to, in response to the request, open a review project template associated with a geographic information system (GIS) application and select a workspace page of a number of selectable workspace pages provided by the review project template, the selected workspace page including a legend portion configured to display one or more identifiers each representing a data set corresponding to a map attribute of a number of map attributes of the particular region which can be in an activated or a deactivated mode and a content portion that displays a map content corresponding to the particular geographic region based on which of the number of map attributes are in the activated mode; and a subsystem configured to provide the selected workspace page to an actuarial reviewer for analysis.

The disclosure also provides a method for geographic mapping and review that includes receiving a request for an actuarial review of a particular geographic region; in response to the request, opening a review project template associated with a geographic information system (GIS) application; selecting a workspace page of a number of selectable workspace pages provided by the review project template, the selected workspace page including a legend portion configured to display one or more identifiers each representing a data set corresponding to a map attribute of a number of map attributes of the particular region which can be in an activated or a deactivated mode and a content portion that displays a map content corresponding to the particular geographic region based on which of the number of map attributes are in the activated mode; and providing the selected workspace page to an actuarial reviewer for analysis.

The disclosure further provides a computer readable medium having instructions stored thereon that can be executed by a computing device to: receive a request for an actuarial review of a particular geographic region; in response to the request, open a review project template associated with a geographic information system (GIS) application; select a workspace page of a number of selectable workspace pages provided by the review project template, the selected workspace page including a legend portion configured to display one or more identifiers each representing a data set corresponding to a map attribute of a number of map attributes of the particular region which can be in an activated or a deactivated mode and a content portion that displays a map content corresponding to the particular geographic region based on which of the number of map attributes are in the activated mode; and provide the selected workspace page to an actuarial reviewer for analysis.

One or more embodiments of the present disclosure provides a system for geographic mapping and review that includes a geographic information system (GIS) application. The GIS application includes: a number of workspace pages including a number of map attributes that each can be activated and deactivated when the workspace page is opened, a map content displayed by the workspace page based on which of the number of map attributes are currently activated; and a number of layout pages each corresponding to a particular workspace page and preconfigured to display the map content of a particular workspace page according to a particular format. The system includes a subsystem configured to automatically display a current map content of the particular workspace page within a view portion of the layout page according to the particular format when the layout page is opened.

The present disclosure also provides a method for geographic mapping and review that includes operating a geographic information system (GIS) application. The GIS application includes: a number of workspace pages including a number of map attributes that each can be activated and deactivated when the workspace page is opened, a map content displayed by the workspace page based on which of the number of map attributes are currently activated; and a number of layout pages each corresponding to a particular workspace page and preconfigured to display the map content of a particular workspace page according to a particular format. The method includes automatically displaying a current map content of the particular workspace page within a view portion of the layout page according to the particular format when the layout page is opened.

The disclosure further provides a computer readable medium having instructions stored thereon that can be executed by a computing device to operate a geographic information system (GIS) application that includes: a number of workspace pages including a number of map attributes that each can be activated and deactivated when the workspace page is opened, a map content displayed by the workspace page based on which of the number of map attributes are currently activated; and a number of layout pages each corresponding to a particular workspace page and preconfigured to display the map content of a particular workspace page according to a particular format. The instructions can be executed to automatically display a current map content of the particular workspace page within a view portion of the layout page according to the particular format when the layout page is opened.

BRIEF DESCRIPTION OF THE DRAWINGS

FIG. 2A illustrates an application window depicting an opened review project template corresponding to a particular geographic region in accordance with an embodiment of the present disclosure.

FIG. 2B illustrates an application window upon selection of a workspace page in accordance with an embodiment of the present disclosure.

FIG. 2C illustrates a workspace page including map content in accordance with an embodiment of the present disclosure.

DETAILED DESCRIPTION

The present disclosure describes systems and methods for providing geographic mapping and review processes using a geographic information system (GIS) application. In various embodiments, a project template useful in an actuarial review process is provided within the GIS application. In one or more embodiments, the project template can include a number of selectable workspace pages configured to display a map content associated with a particular geographic region based on activation of one or more selectable map attributes associated with each of the number of selectable workspace pages. In various embodiments, the project template can include a number of selectable layout pages configured to display the map content of a particular one of the number of selectable workspace pages along with other map information in a particular arrangement upon selection.

Various embodiments of the present disclosure can provide benefits such as improving the accuracy and/or efficiency associated with actuarial review processes such as a territory boundary reviews and/or a relativity review conducted in the insurance and/or financial industries, for instance. As an example, embodiments of the present disclosure can decrease the time associated with preparing maps used by actuarial analysts in the review process. Such maps may include territory boundaries associated with risk assessments for a particular geographic region such as a state, city, and/or country, among other geographic regions.

One or more embodiments can improve the accuracy associated with preparing the maps by providing a substantially automated method of producing the maps according to a particular standardization. For instance, the automation provided by embodiments of the present disclosure can provide a reduction of, or elimination of, errors associated with manual processes of previous mapping approaches.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

Figure 1A:
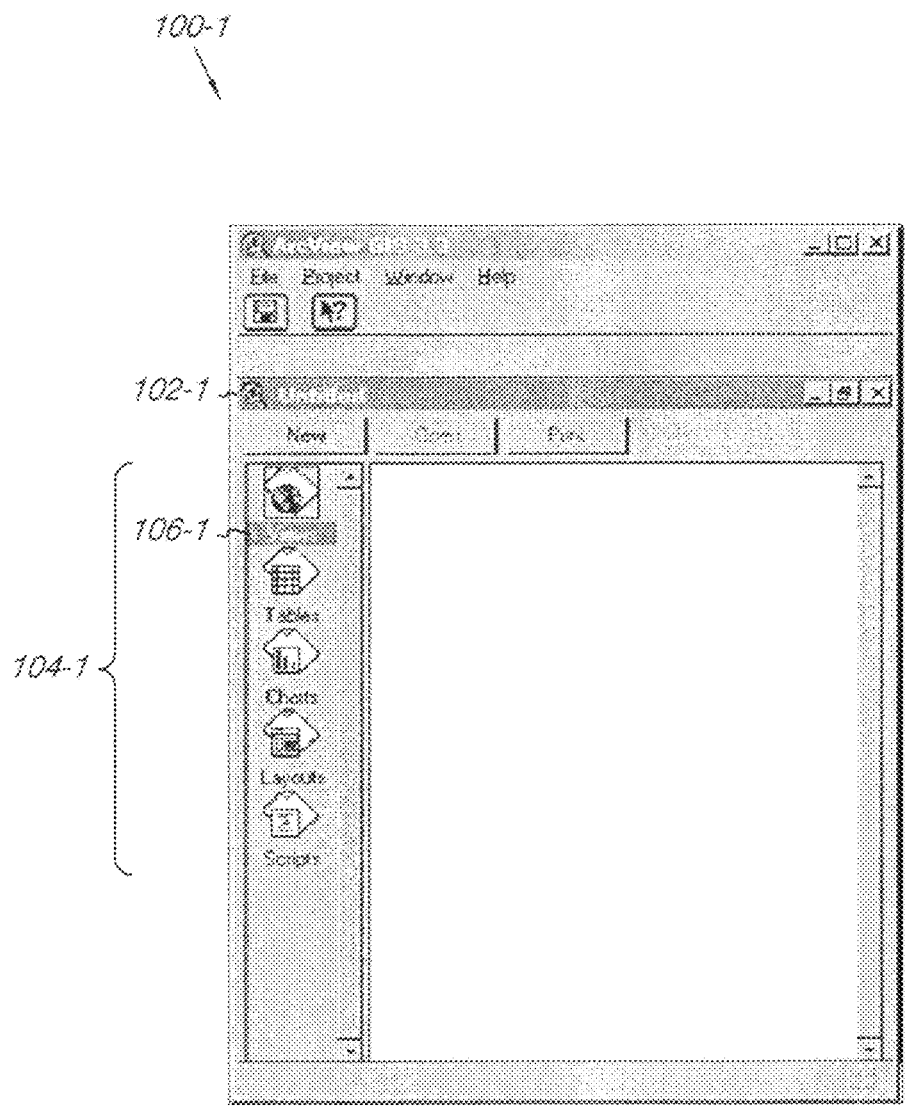
FIG. 1A illustrates an application window depicting an opened project according to a previous geographic mapping and review approach.
Figure 1B:
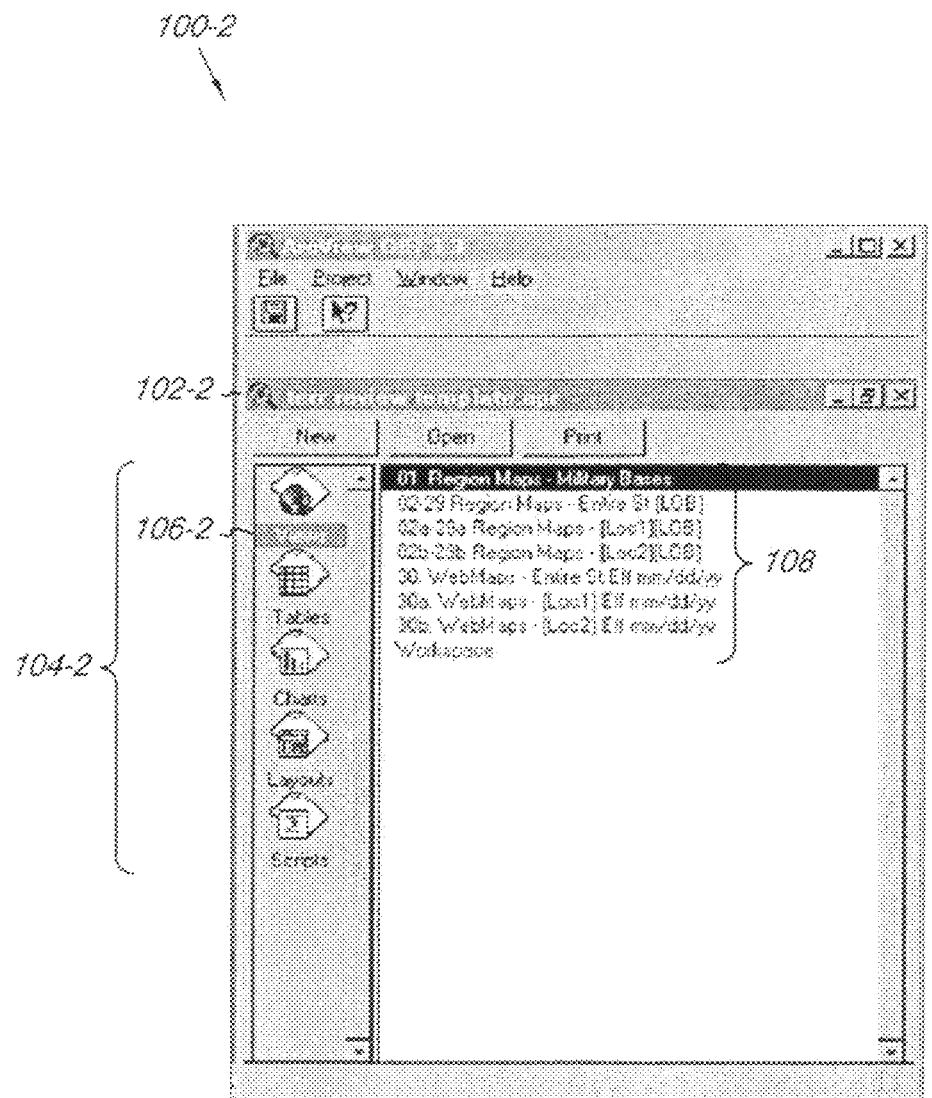
FIG. 1B illustrates an application window depicting an opened review project template in accordance with an embodiment of the present disclosure.

FIG. 1A illustrates an application window 100-1, e.g., a graphical user interface (GUI), depicting an opened project 102-1 according to a previous geographic mapping and review approach. FIG. 1B illustrates an application window 100-2 depicting an opened review project template 102-2 in accordance with an embodiment of the present disclosure. Although the examples illustrated in various figures of the present disclosure depict application windows associated with a graphical user interface (GUI) of an ArcView GIS application, embodiments of the present disclosure are not limited to a particular type of GIS application or GUI that can be used for geographic mapping and review processes described herein.

In the example illustrated in FIG. 1A, the opened project 102-1 ("Untitled") associated with application window 100-1 includes a list of elements 104-1 associated with different functional capabilities of the GIS application. A user of the GIS application can select a particular element from the list 104-1, e.g., via a method such as "clicking" on the desired element using an input device such as a mouse among various other methods known in the art. In the example shown in FIG. 1A, the "Views" element 106-1 has been selected as indicated by highlighting shown in FIG. 1A.

In previous approaches such as shown in FIG. 1A, opening a new project, e.g., 102-1, resulted in an empty instance of the GIS application. As such, selecting the "Views" element 106-1 in the project 102-1 made it possible to create a new workspace page, which could then be loaded with desired map data and formatted in order to display a map corresponding to the map data. The map could then be used in an actuarial review process, e.g., by an actuarial analyst, for instance. Examples of workspace pages are described further in connection with FIGS. 1B and 2A-2E.

However, a number of different maps and/or map formats may be used in a particular actuarial review process. As such, a previous approach for creating workspace pages, such as the approach described in FIG. 1A, can result in significant user time and effort in creating the various maps required and/or requested for a particular review process. As an example, a "user" can refer to an operator of a computing device on which the GIS application is running and/or on which a GUI associated with the GIS application is displayed.

In various embodiments, a review project template can be provided within a GIS application. For instance, FIG. 1B illustrates an application window 100-2 depicting an opened review project template 102-2 in accordance with an embodiment of the present disclosure. In the example illustrated in FIG. 1B, the opened project 102-2 ("terr review template.apr") associated with application window 100-2 includes a list of elements 104-2 associated with different functional capabilities of the GIS application.

The elements 104-2 shown in the embodiment illustrated in FIG. 1B are the same as the elements 104-1 illustrated in FIG. 1A. However, opening the review project template 102-2 and selecting the "Views" element 106-2 provides a number of workspace pages 108 selectable by a user. As described further below in connection with FIGS. 2A-2E, in various embodiments, the number of selectable workspace pages, e.g., 108, can be configured to display a map content associated with a particular geographic region based on activation of one or more selectable map attributes associated with each of the number of selectable workspace pages, e.g., 108.

Figures 2A, 2B:
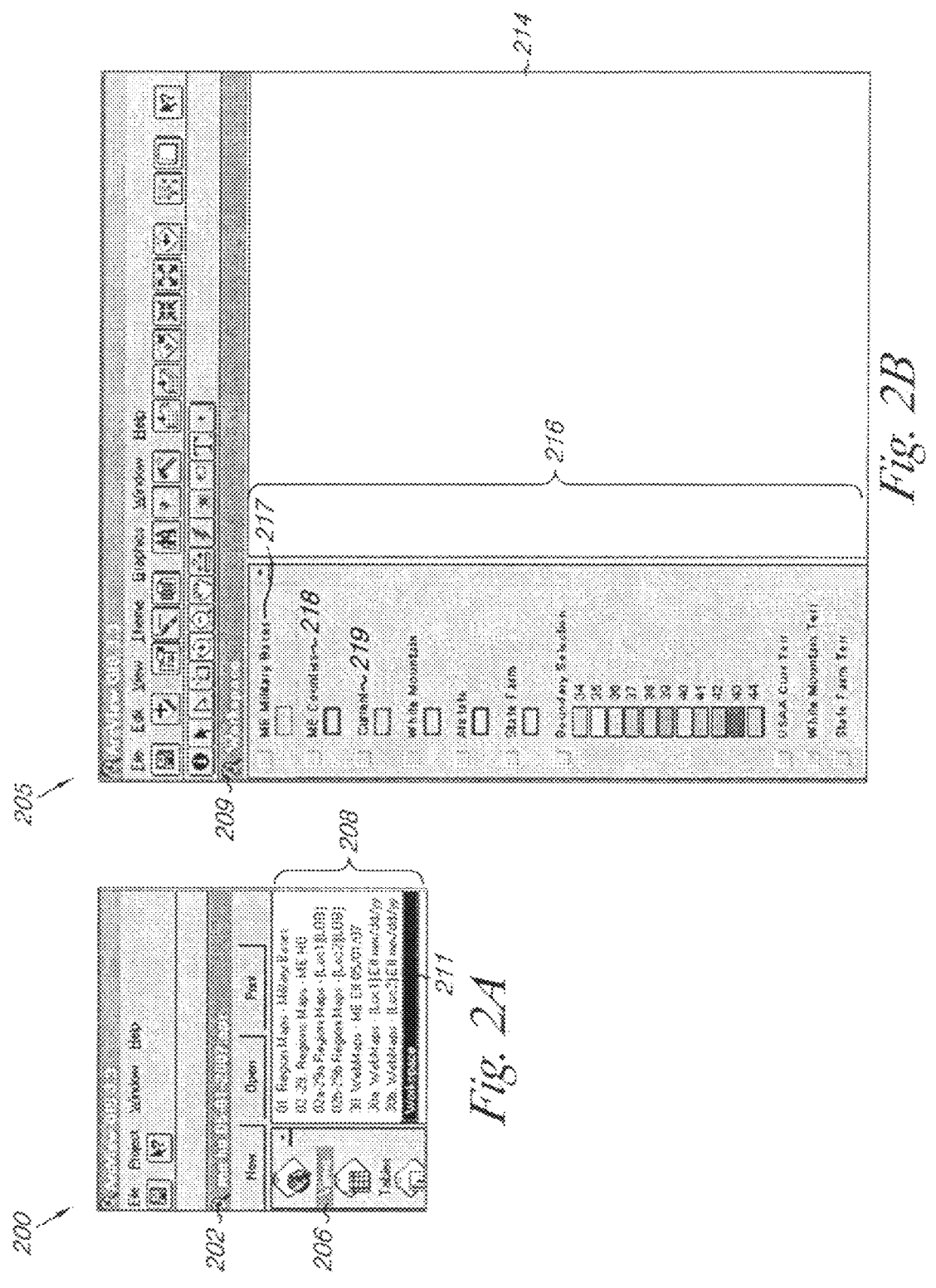

FIG. 2A illustrates an application window 200 depicting an opened review project template 202 corresponding to a particular geographic region in accordance with an embodiment of the present disclosure. FIG. 2B illustrates an application window 205 upon selection of a workspace page, e.g., workspace page 211 ("Workspace") shown in FIG. 2A, in accordance with an embodiment of the present disclosure.

Figure 2D:
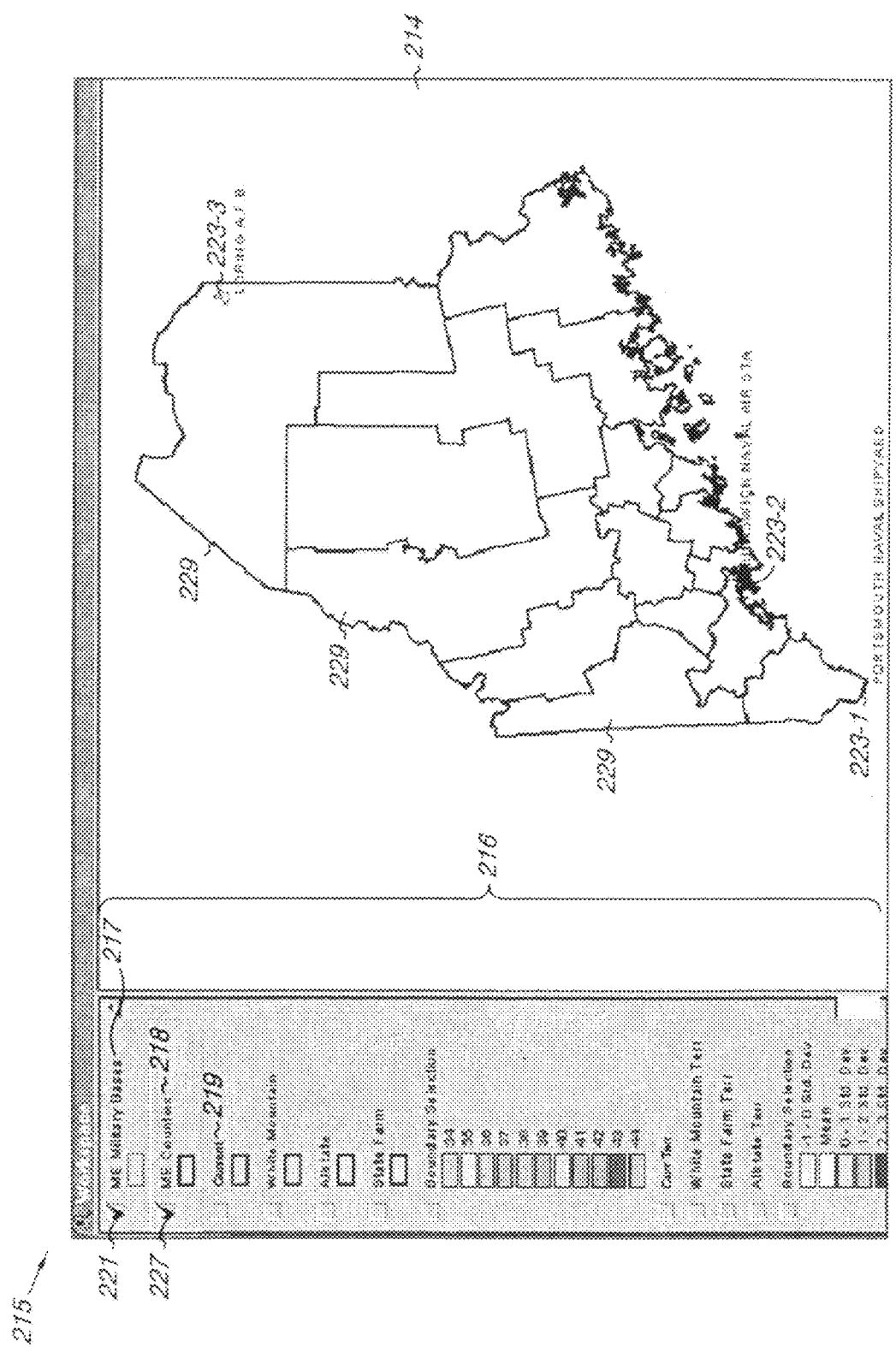
FIG. 2D illustrates the workspace page shown in FIG. 2C including additional map content in accordance with an embodiment of the present disclosure.

In the embodiment illustrated in FIG. 2A the opened review project 202 ("me ho 05-01-2007.apr") corresponds to a particular State, e.g., Maine in the examples shown in FIGS. 2A-2E. However, embodiments of the present disclosure are not limited to a particular geographic region or to a particular type of geographic region.

As illustrated in FIG. 2A and as described above, opening the review project template 202 and selecting the "Views" element 206 provides a number of workspace pages 208 selectable by a user. In the example illustrated in FIG. 2A, a particular workspace page 211 ("Workspace") is selected as indicated by highlighting. Selecting the workspace page 211 in application window 200 of FIG. 2A opens the workspace page 209 as illustrated in application window 205 shown in FIG. 2B.

In various embodiments, a selected workspace page includes a legend portion and a content portion. For instance, as shown in the embodiment illustrated in FIG. 2, the selected workspace page 209 includes a legend portion 216 and a content portion 214.

In one or more embodiments, the legend portion, e.g., 216, can be configured to display one or more identifiers each representing a data set corresponding to a map attribute of a number of map attributes of the particular region which can be in an activated or a deactivated mode. Legend portion 216 shown in FIG. 2B includes identifiers 217 ("ME Military Bases"), 218 ("ME Counties") and 219 ("Current") each representing a data set corresponding to a particular map attribute.

Figure 2E:
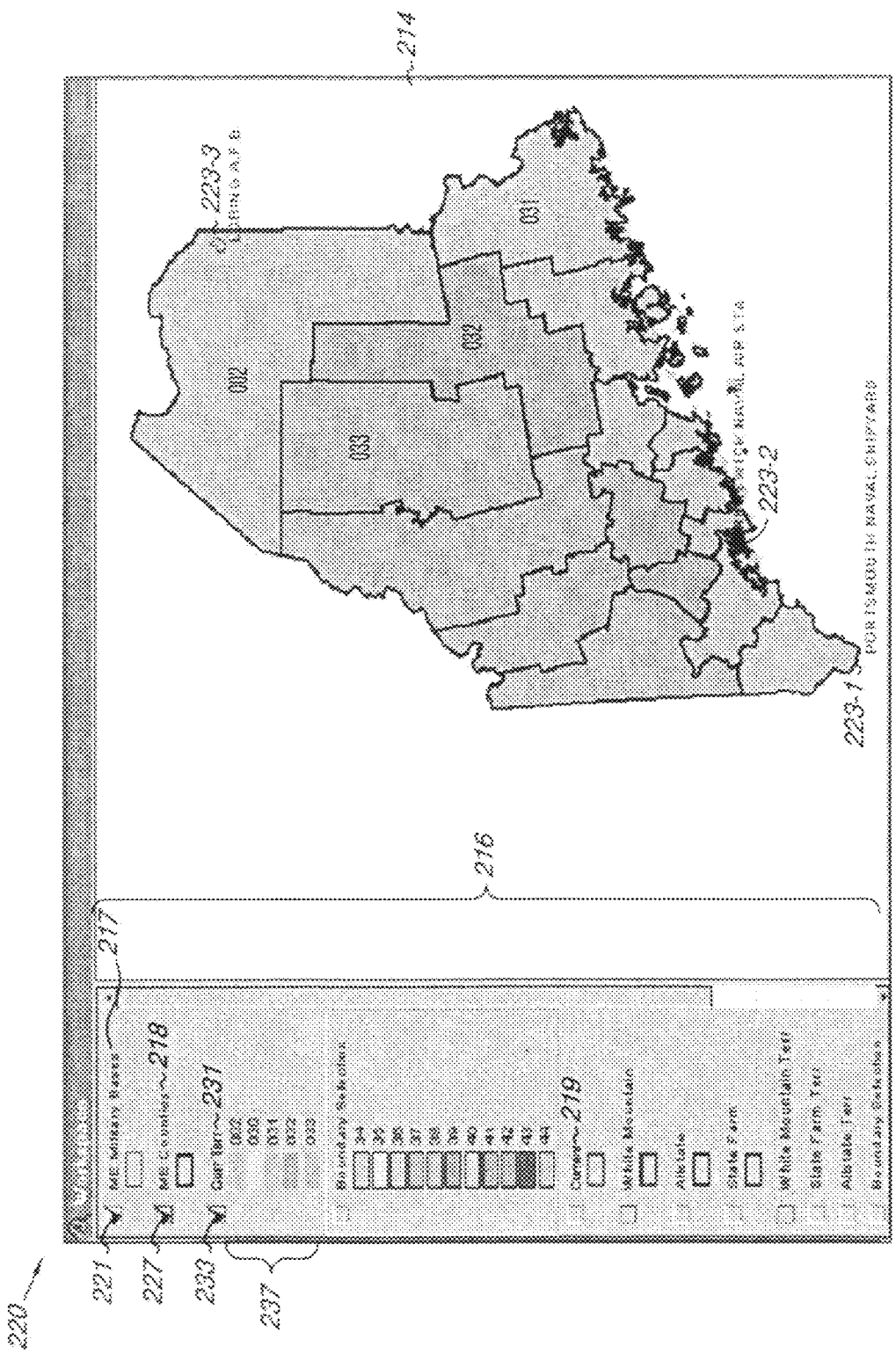
FIG. 2E illustrates the workspace page shown in FIG. 2D including additional map content in accordance with an embodiment of the present disclosure.

For example, as described further in connection with FIGS. 2C-2E, the identifier 217 can represent a data set corresponding to military bases located within the particular geographic region, e.g., Maine (ME) in this example. In this example, the identifier 218 can represent a data set corresponding to county boundary lines for Maine, and the identifier 219 can represent a data set corresponding to current territory outlines associated with an insurance company within Maine. As an example, the current territory outlines associated with the insurance company can be useful for comparison with current territory outlines associated with other insurance companies within Maine, e.g., competitor insurers such as "White Mountain," "Allstate," and "State Farm," as illustrated in legend portion 216 shown in FIG. 2B. For reference purposes, map attributes can be referred to according to their corresponding identifier. For instance, the map attribute corresponding to each of the identifiers 217, 218, and 219 can be referred to as the map attributes 217, 218, and 219, respectively.

In various embodiments, one or more of the data sets corresponding to the number of map attributes can be stored in a geospatial vector data format, e.g., the data sets can be shape files. However, embodiments are not limited to data stored in a particular format.

In various embodiments, one or more map attributes can be added to and/or removed from the particular workspace page, e.g., 209. That is, data sets corresponding to the one or more map attributes can be stored in or removed from a particular workspace page. In one or more embodiments, a work space page, e.g., 209, can be preconfigured to include one or more particular map attributes. For instance, one or more of the selectable workspace pages 208 illustrated in FIG. 2A can be preconfigured with particular map attributes as requested by a user performing an actuarial review.

In one or more embodiments, an actuarial reviewer can adjust the data within one or more of the data files corresponding to one or more map attributes. For example, an actuarial reviewer can adjust the data within a data file corresponding to a territory boundary map attribute in order to adjust boundary parameters as a part of a territory boundary review of the particular region. In such embodiments, the adjustments made to the data file can be saved to the workspace page file and a map of including the adjusted map content can be created for further display and/or further use in the actuarial review process.

In one or more embodiments, the content portion, e.g., 214, displays a map content corresponding to the particular geographic region, e.g., Maine in this example, based on which of the number of map attributes are in an activated/deactivated mode. In the embodiment illustrated in FIG. 2B, none of the map attributes in legend portion 216 are activated, e.g., each of the map attributes of legend portion 216 is in a deactivated mode. As such, in the embodiment illustrated in FIG. 2B, no map content is displayed in content portion 214 of the workspace page 209.

FIGS. 2C-2E illustrate workspace page windows that depict the workspace page 209 shown in FIG. 2B including different displayed map content based on which of a number of map attributes of legend portion 216 are activated, e.g., turned on, in accordance with embodiments of the present disclosure. For instance, in the embodiment illustrated in FIG. 2C, only the map attribute 217 is activated, e.g., as indicated by checkmark 221 shown in legend portion 216. A user can activate a map attribute via various methods such as by "clicking" on the attribute identifier using a mouse, among various other suitable methods. Similarly, a user can deactivate, e.g., turn off, one or more of the map attributes by clicking on the attribute identifier, e.g., to remove the checkmark.

In the embodiment illustrated in FIG. 2C, the map attribute 217 ("ME Military Bases") corresponds to a data set representing military bases located in Maine. As such, since the map attribute 217 is in the activated mode, the map data of the corresponding data set is displayed in the content portion 214 of the workspace page window 210 shown in FIG. 2C. In the example illustrated in FIG. 2C, the content portion 214 includes map content for three military bases 223-1, 223-2, and 223-3.

In the embodiment illustrated in FIG. 2D, both the map attribute 217 and the map attribute 218 are activated, e.g., as indicated by checkmarks 221 and 227, respectively. Therefore, in the embodiment illustrated in FIG. 2D, the map content associated with the data set corresponding to the map attribute 218 is added to the map content associated with the data set corresponding to the map attribute 217 and is displayed in content portion 214.

In the embodiment illustrated in FIG. 2D, the map attribute 218 ("ME Counties") corresponds to a data set representing county boundary lines in Maine. As such, the content portion 214 of workspace page window 215 displays map content that includes county boundary lines of the state of Maine. The county boundary lines separate a number of distinct counties 229. In the example illustrated in FIG. 2D, the content portion 214 also includes the map content for the three military bases 223-1, 223-2, and 223-3.

In the embodiment illustrated in FIG. 2E, the map attribute 217, the map attribute 218, and the map attribute 231 of the legend portion 216 are activated, e.g., as indicated by checkmarks 221, 227, and 233, respectively. Therefore, in the embodiment illustrated in FIG. 2E, the map content associated with the data set corresponding to the map attribute 231 is added to the map content associated with the data sets corresponding to the map attributes 217 and 218 and is displayed in content portion 214.

In the embodiment illustrated in FIG. 2E, the map attribute 231 ("Curr Terr") corresponds to a data set representing current territory boundaries for the state of Maine. As such, the content portion 214 of workspace page window 220 displays map content that includes current territory boundaries for Maine. In this example, the current territory boundaries are territory boundaries based on insurance information of an insurer and which are being reviewed via an actuarial boundary review process.

In the example illustrated in FIG. 2E, the map content corresponding to the current territory boundary map attribute 231 is color-coded and number-coded according to the codes 237 shown in legend portion 216. The different territory boundaries can be distinguished based on these codes 237.

As described further below, in one or more embodiments of the present disclosure, a review project template provided within a GIS application, e.g., review project template 202 described in connection with FIG. 2A, can include a number of selectable layout pages configured to display the map content of a particular one of the number of selectable workspace pages, e.g., workspace page 209 described in connection with FIGS. 2B-2E, along with other map information in a particular arrangement upon selection.

In various embodiments, a number of preconfigured layout pages can be provided within the review project template. In one or more embodiments, each of the number of preconfigured layout pages is configured for displaying the map content of a particular one of the number of selectable workspace pages according to a particular format.

Figure 3A:
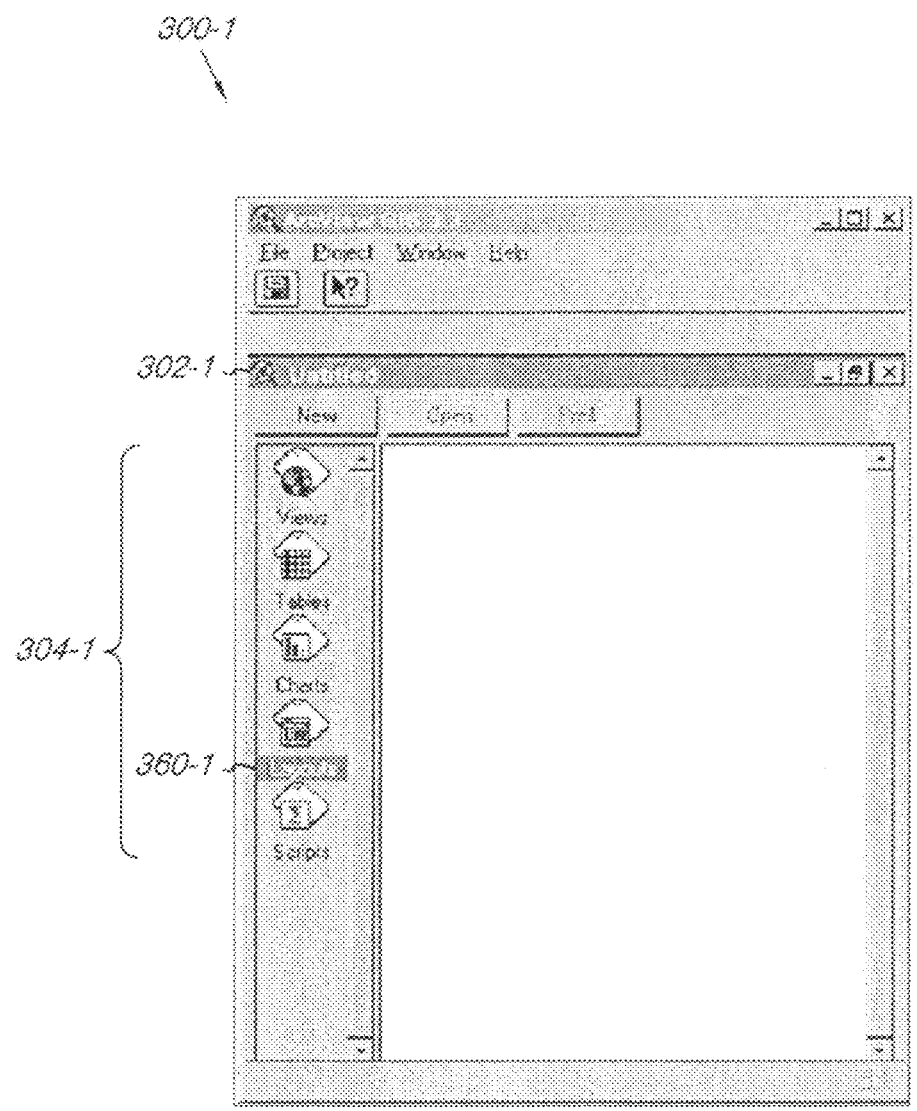
FIG. 3A illustrates an application window depicting an opened project according to a previous approach.
Figure 3B:
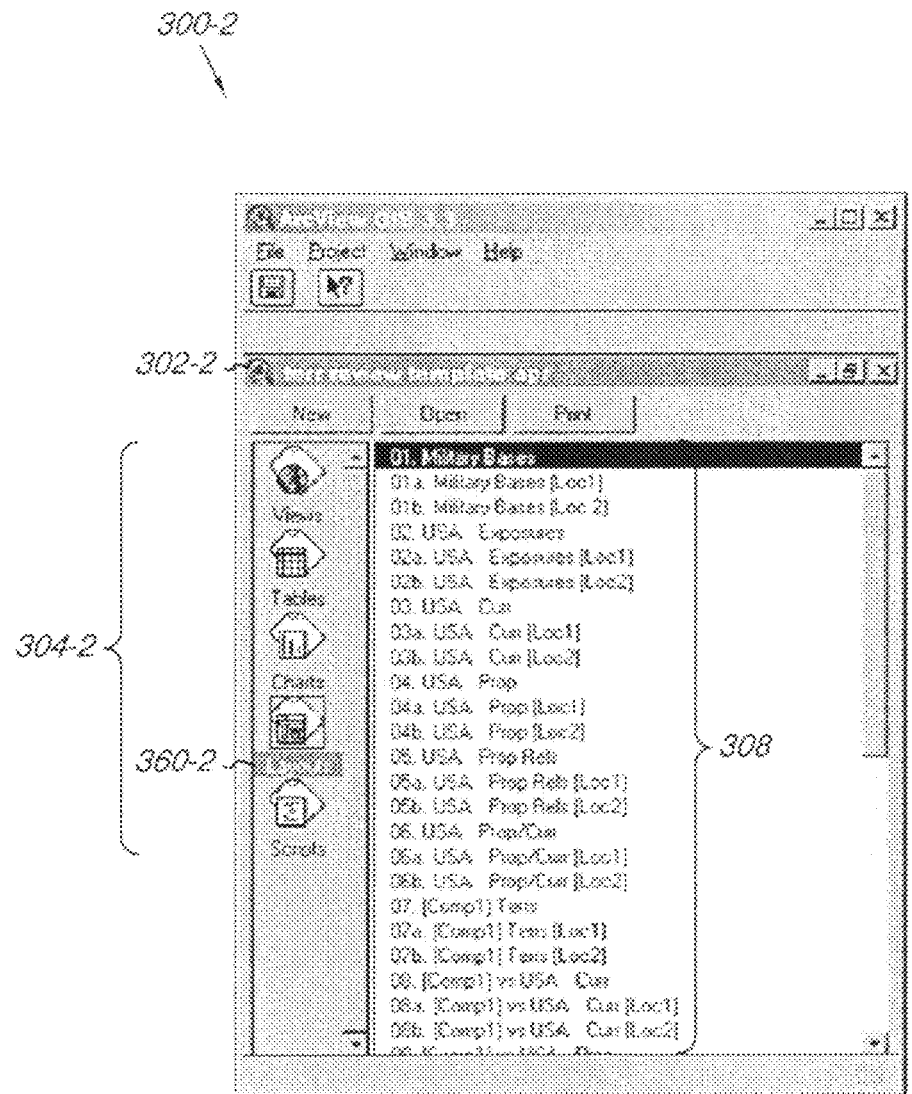
FIG. 3B illustrates an application window depicting an opened review project template in accordance with an embodiment of the present disclosure.

FIG. 3A illustrates an application window 300-1 depicting an opened project 302-1 according to a previous geographic mapping and review approach. FIG. 3B illustrates an application window 300-2 depicting an opened review project template 302-2 in accordance with an embodiment of the present disclosure.

As described above in connection with FIG. 1A, in the example illustrated in FIG. 3A, the opened project 302-1 ("Untitled") associated with application window 300-1 includes a list of elements 304-1 associated with different functional capabilities of the GIS application. In the example shown in FIG. 3A, the "Layouts" element 360-1 has been selected as indicated by highlighting shown in FIG. 3A.

In previous approaches such as shown in FIG. 3A, opening a new project, e.g., 302-1, resulted in an empty instance of the GIS application. As such, selecting the "Layouts" element 360-1 in the project 302-1 made it possible to create a new layout page, which could then be populated with map content associated with a particular workspace page in order to create a map that could be used in an actuarial review process. The layout pages could be populated with legends and other map information in addition to the map content of the workspace pages. The various map content and information could then be positioned by the user of the GIS application and header information could be added to the layout page via a manual process.

However, a number of different map formats may be used in a particular actuarial review process and the particular formats may depend on the particular workspace page and/or map content associated therewith. As such, the previous approach for creating layout pages, such as the approach described in FIG. 3A, can result in significant user time and effort in creating the various maps according to various different formatting requests and/or requirements for a particular review process. Furthermore, the previous approach could result in inaccuracies associated with positioning various map content and/or in labeling.

As described above, in various embodiments, a review project template can be provided within a GIS application. As described above in connection with FIG. 1B, FIG. 3B illustrates an application window 300-2 depicting an opened review project template 302-2 in accordance with an embodiment of the present disclosure. In the example illustrated in FIG. 3B, the opened project 302-2 ("ten review template.apr") associated with application window 300-2 includes a list of elements 304-2 associated with different functional capabilities of the GIS application.

The elements 304-2 shown in the embodiment illustrated in FIG. 3B are the same as the elements 304-1 illustrated in FIG. 3A. However, opening the review project template 302-2 and selecting the "Layouts" element 360-2 provides a number of layout pages 308 selectable by a user. The selectable layout pages are linked to a number of workspace pages within the project review template e.g., workspace pages 108 described in connection with FIG. 1B, and are configured to display the map content of a particular workspace page. For instance, the selectable layout pages can be preconfigured to display map content of a workspace page of a number of selectable workspace pages provided by the review project template in accordance with a particular format and/or arrangement.

A review project template provided within a GIS application in accordance with embodiments of the present disclosure can include computer executable instructions that can be executed by a processor to automatically display the map content of a particular workspace page within a view portion of a layout page according to a preconfigured format when the layout page is selected. For example, a user can open a review project template associated with a particular geographic region, e.g., review template 302-2 shown in FIG. 3B. Opening the review project template 302-2 and selecting the "Layouts" element 360-2 provides a number of layout pages 308 selectable by the user. Selection of a particular layout page can result in automatic display to a layout page view portion, e.g., view portion 461 described below in FIGS. 4A-4C, of map content of the workspace page linked to the selected layout page along with other map information arranged according to a preconfigured format associated with the selected layout page.

In various embodiments, each of the number of selectable layout pages 308 is configured according to a particular standardization associated with the map content of the particular one of the number of selectable workspace pages, e.g., workspace pages 208 illustrated in FIG. 2A. In one or more embodiments, the number of selectable layout pages 308 are preformatted so as to automatically display map content, legends, header information, and other map information in a particular arrangement. Such embodiments can reduce the likelihood of user error associated with manually positioning images and/or manually entering header information.

Figure 4A:
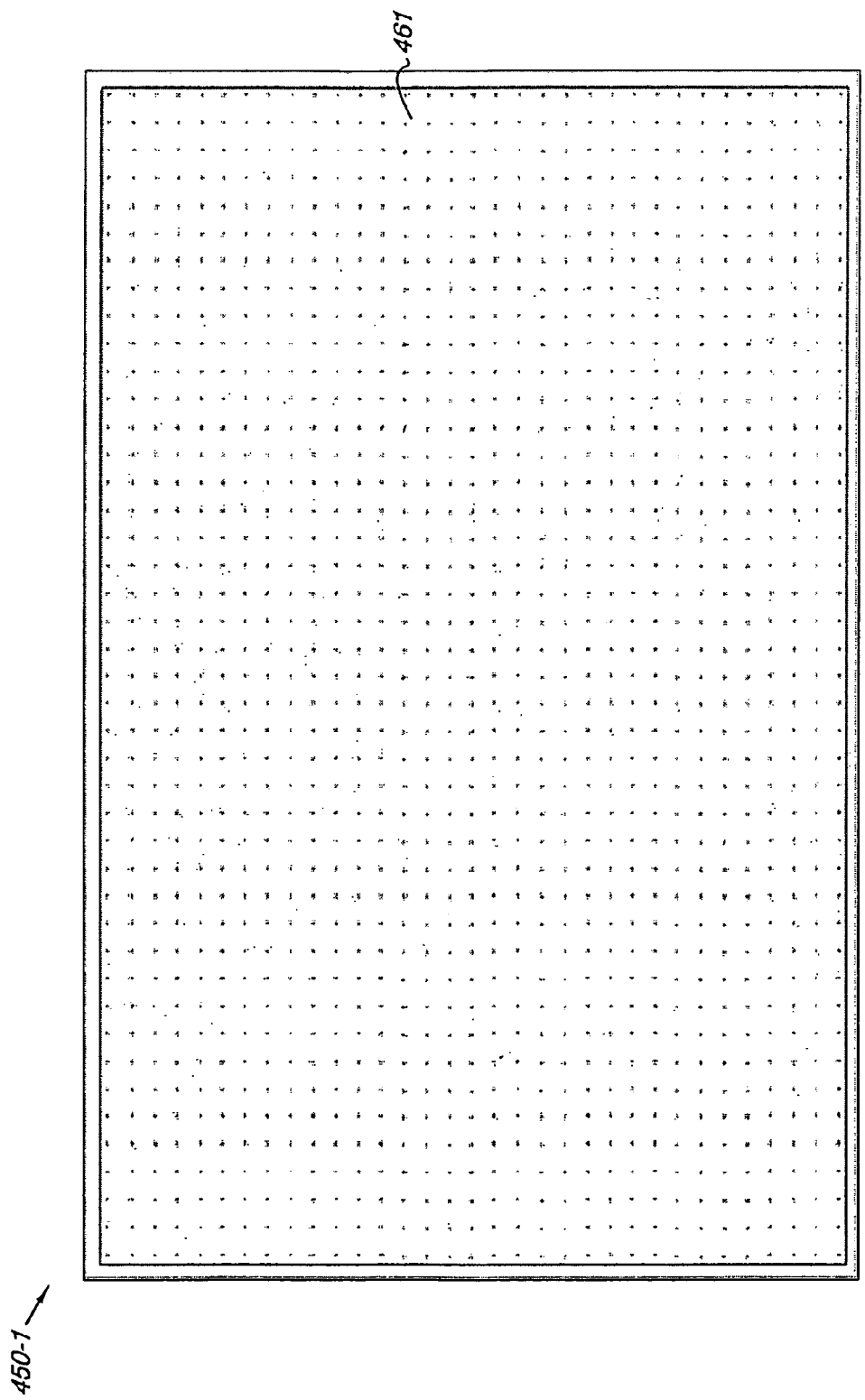
FIG. 4A illustrates a layout page according to a previous approach.
Figure 4B:
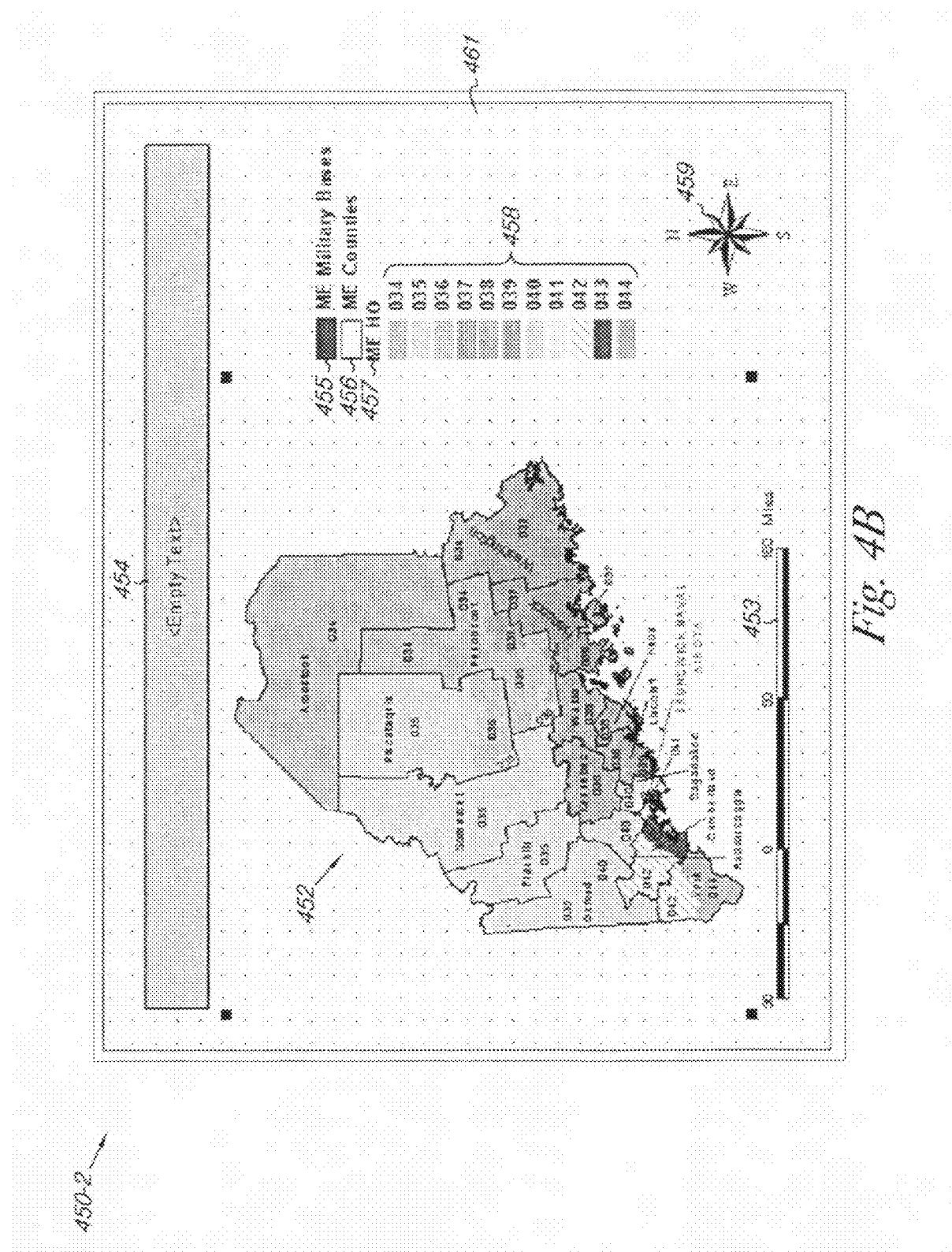
FIG. 4B illustrates a layout page according to a previous approach.
Figure 4C:
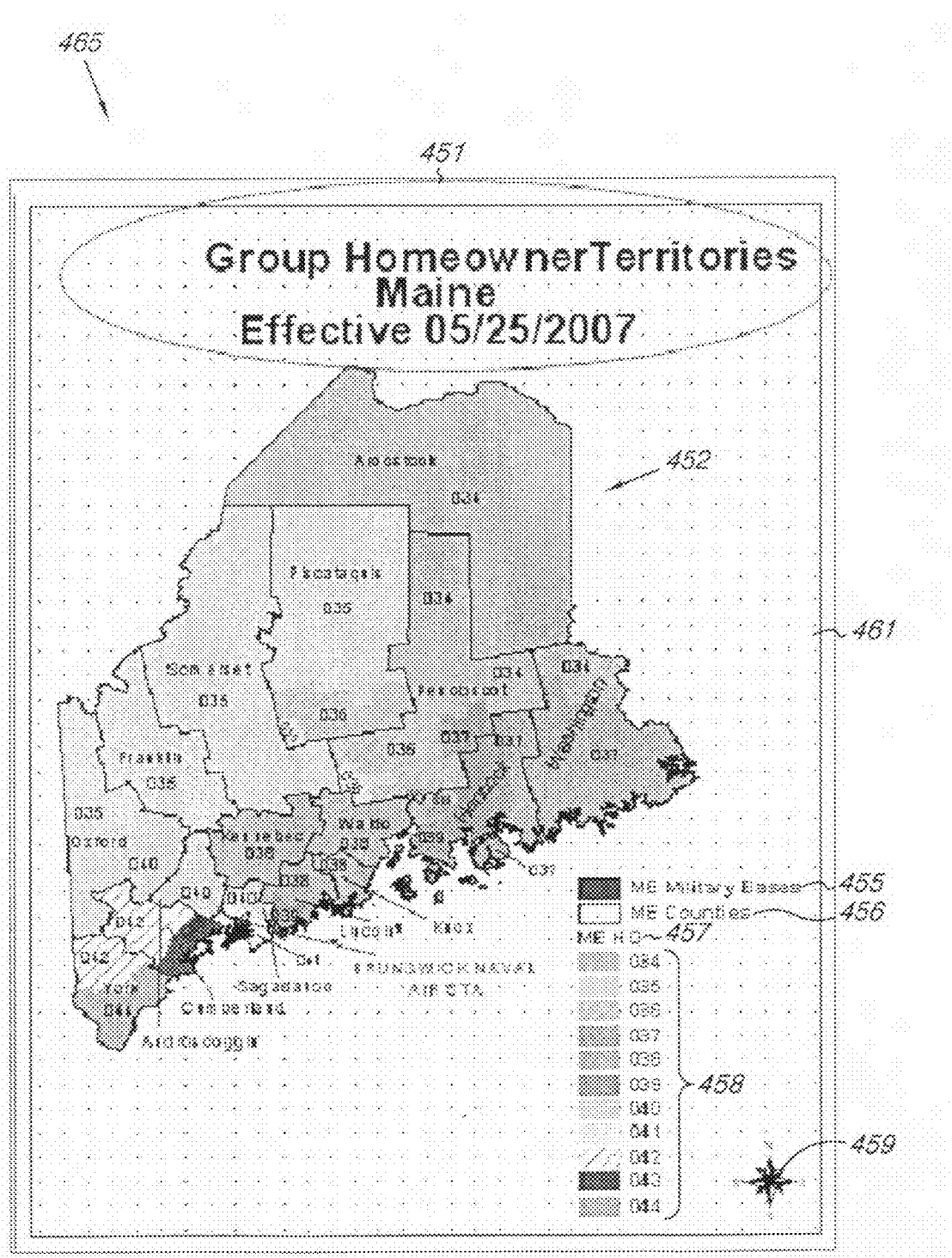
FIG. 4C illustrates a layout page in accordance with an embodiment of the present disclosure.

FIG. 4A illustrates an opened layout page 450-1 with an empty, e.g., blank, view portion 461 according to a previous approach. FIG. 4B illustrates an opened layout page 450-2 depicting the view portion 461 according to a previous approach. FIG. 4C illustrates an opened layout page 465 depicting the view portion 461 in accordance with an embodiment of the present disclosure.

In the previous approach illustrated in FIGS. 4A and 4B, a user of the GIS application could open a new layout page, e.g., by selecting "Layout" 360-1 in an opened blank project 302-1 as described in connection with FIG. 3A, could manually insert a page property or select a page property template, and then could navigate to and select a workspace page whose content would then be displayed in the view portion of the layout page according to the selected page property template.

In the previous approach illustrated in FIG. 4B, the view portion 461 of layout page 450-2 is populated with map content 452, e.g., map content from a workspace page, legend content, e.g., elements 455, 456, 457, and 458, a scale icon 453, an orientation icon 459, and a header portion 454.

However, in such previous approaches, the format of the selected page property template was not preconfigured according to a desired format of the user and/or reviewer. In such situations, the format of layout page 450-2 and/or of items therein would require manual adjustments. For instance, a user might be required to resize and/or rearrange one or more items within view 461 of layout page 450-2, e.g., items 452, 453, 455, 456, 457, 458, and/or 459, in order for the content of layout page 450-2 to be presented in a particular requested/required format.

Other manual adjustments to a layout page that may be required due to previous approaches such as that shown in FIGS. 4A and 4B include adjustment of the orientation of the view portion 461, e.g., from landscape to portrait, the removal of undesired items included in the view portion, e.g., scale icon 453 and orientation icon 459, and/or the addition of certain items to the view portion which were not included in the preconfigured template of previous approaches, e.g., various icons, labels, or other items. Also, in previous approaches such as that shown in FIGS. 4A and 4B, a user was required to manually enter information into the header portion 454 of layout page 450-2.

FIG. 4C illustrates a layout page 465 in accordance with an embodiment of the present disclosure. In the embodiment illustrated in FIG. 4C, the view portion 461 of layout page 465 is populated with map content 452, e.g., map content from a workspace page, legend content, e.g., elements 455, 456, 457, and 458, an orientation icon 459, and a header portion 451.

Unlike in the previous approach shown in FIGS. 4A and 4B, the layout page 465 illustrates a particular desired content and format of material displayed in the view portion 461. The content of layout page 465 does not require adjustments. For instance, the layout page 465 includes the desired items each sized and arranged according to the desired format along with the desired appropriate header information.

As described above in connection with FIG. 3B, various embodiments of the present disclosure can include a review project template, e.g., 302-2 shown in FIG. 3B, provided within a GIS application. In one or more embodiments, the review project template includes a number of selectable layout pages, e.g., selectable layout pages 308 shown in FIG. 3B. The selectable layout pages are linked to a number of workspace pages within the project review template e.g., workspace pages 108 described in connection with FIG. 1B, and are configured to display the map content of a particular workspace page. For instance, the selectable layout pages can be preconfigured to display map content of a workspace page of a number of selectable workspace pages provided by the review project template in accordance with a particular format and/or arrangement.

In one or more embodiments, the content of a layout page, e.g., layout page 465, can be exported to a bitmap, e.g., stored as a digital images in a format such as gif, jpeg, or tiff, among other suitable file formats. In various embodiments, a number of stored images can be provided to an actuarial reviewer for analysis and/or can be stored on a server and posted on an intranet site for viewing. The intranet site can be a secure site having restricted access, e.g., non-public.

Figure 5:
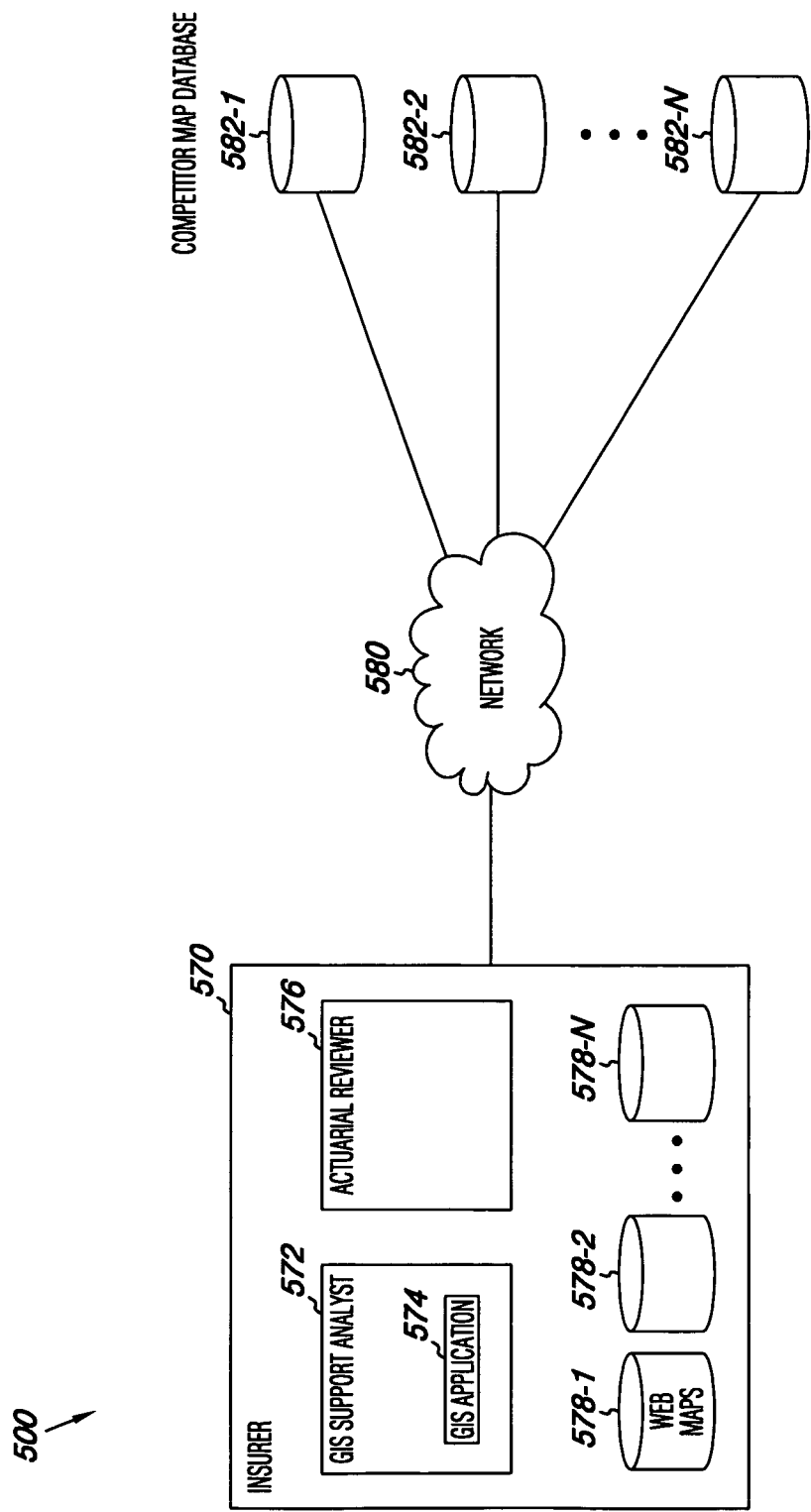
FIG. 5 illustrates a system for providing geographic mapping and review in accordance with one or more embodiments of the present disclosure.

FIG. 5 illustrates a system 500 for providing geographic mapping and review in accordance with one or more embodiments of the present disclosure. In the embodiment illustrated in FIG. 5, the system 500 includes a subsystem 570 coupled, via network 580, to a number of databases 582-1, 582-2, . . . , 582-N.

As an example, the subsystem 570 can be a network such as a local area network (LAN), personal area network (PAN), campus area network (CAN), or metropolitan area network (MAN). In the embodiment illustrated in FIG. 5, the subsystem 570 is an insurer network 570, e.g., a network of an insurance provider.

The network 580 illustrated in system 500 can represent a wide area network (WAN) such as the Internet. The databases 582-1, 582-2, . . . , 582-N can store map data accessible by the subsystem 570 via network 580. In the embodiment illustrated in FIG. 5, the database 582-1 represents a database storing map data of a competitor, e.g., of an insurer other than the insurer associated with subsystem 570.

In the embodiment illustrated in FIG. 5, the subsystem 570 can include a computing device 572 and a computing device 576. The computing devices 572 and 576 can be a desktops, laptops, or handheld computing devices, among other types of computing devices. As the reader will appreciate, the computing devices 572 and 574 can include one or more processors and memory resources (not shown in FIG. 5) capable of storing computer executable instructions. As used herein, the term "computer executable instructions" refers to instructions that may be performed by a processor and/or other components.

In various embodiments, the computing device 572 is configured to receive a request for an actuarial review of a particular geographic region, e.g., a territory boundary review and/or relativity review. The computing device 572 can execute a GIS application 574, e.g., an ArcView application or other GIS tool, stored thereon and/or accessible thereby. A review project template such as that described above can be provided within the GIS application 574 and used to perform various embodiments of the present disclosure. Although not shown in FIG. 5, the computing device 576 can also include a GIS application.

An operator of the computing device 572, e.g., a GIS analyst associated with the insurer subsystem 570, can use a GUI associated with the GIS application 574 in order to prepare a project for actuarial review based on the received review request. For instance, the analyst can select appropriate workspace pages and/or layout pages as described above, which can be provided to an actuarial analyst for review, e.g., the workspace pages and/or layout pages can be provided to the actuarial reviewer computing device 576.

In various embodiments, competitor map data, which can be used in the review process, can be obtained from a competitor database, e.g., 582-1, and can be incorporated into one or more workspace pages and/or layout pages used in the review process. As described above, an actuarial reviewer can adjust data associated with workspace pages and/or layout pages as part of the review process and can provide adjusted data back to the support analyst for incorporation into the workspace pages and/or layout pages corresponding to the particular review.

As illustrated in FIG. 5, the subsystem 570 includes a number of data bases 578-1, 578-2, . . . , 578-N. The data bases 578-1, 578-2, . . . , 578-N can store map data files used to create map content in accordance with embodiments described herein. In this example, the database 578-1 represents a database storing map content that can be posted to an intranet site associated with the insurer subsystem 570. As an example, the map content posted to the intranet site can include adjusted boundary determinations made during the review process.

Figure 6:
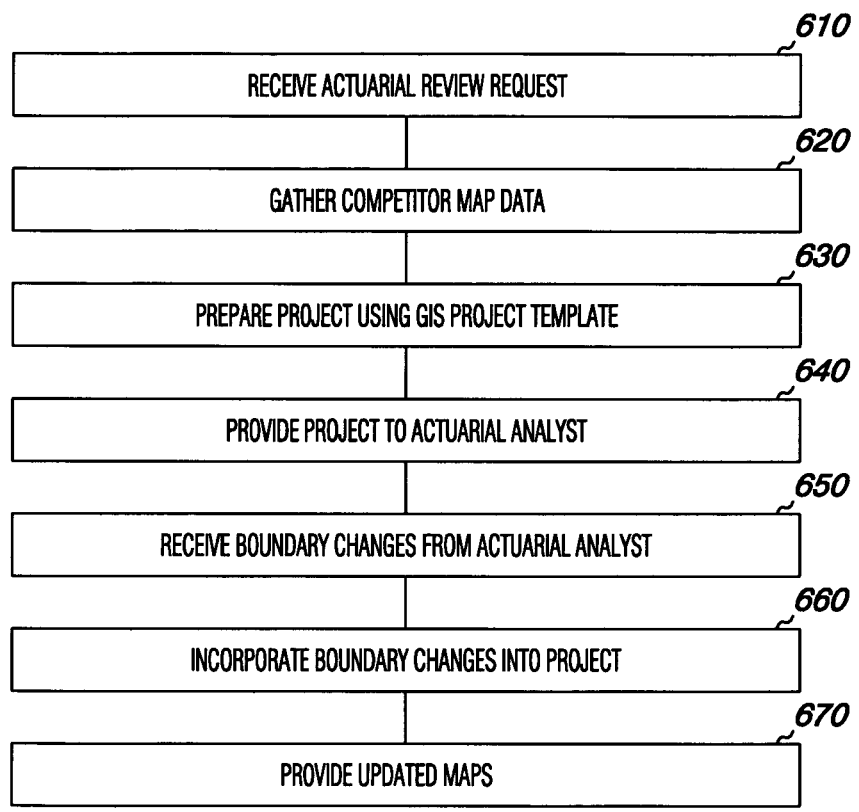
FIG. 6 illustrates a method for geographic mapping and review according to an embodiment of the present disclosure.

FIG. 6 illustrates a method for geographic mapping and review according to an embodiment of the present disclosure. As illustrated at block 610, the method includes receiving an actuarial review request. The actuarial review request can be associated with a particular region, e.g., the request can be a territory boundary review request and/or a relativity review request associated with the insurance industry, among various other types of reviews in which geographic mapping may be used.

At block 620, the method illustrated in FIG. 6 includes gathering competitor map data. As an example, the competitor map data can include geographic insurance data such as boundary data associated with a competitor's risk assessments within a particular region, among other geographic data. In various embodiments, the obtained competitor map data can be incorporated into a particular review of an insurer.

At block 630, the method includes preparing a review project using a GIS application using a review project template as described above in connection with FIGS. 1A-5. As described above, the review project template can include a number of selectable workspace pages configured to display a map content associated with a particular geographic region based on activation of one or more selectable map attributes associated with each of the number of selectable workspace pages, and a number of selectable layout pages configured to display the map content of a particular one of the number of selectable workspace pages along with other map information in a particular arrangement upon selection.

At block 640, the method includes providing the prepared review project to an actuarial analyst. In one or more embodiments, the actuarial analyst reviews and/or analyzes map content, e.g., current territory boundaries, of the prepared project. In various embodiments, the actuarial analyst can adjust one or more data files corresponding to one or more particular map attributes in order to adjust the map content associated with one or more workspace pages and/or layout pages. For instance, the actuarial analyst may adjust a data file associated with a territory boundary map attribute in order to adjust one or more territory boundaries under review.

At block 650, the method illustrated in FIG. 6 includes receiving the boundary changes from the actuarial analyst and at block 660 the method includes incorporating the received boundary changes into the review project. As shown at block 670, updated maps that include the incorporated boundary changes can then be provided. The updated maps can be provided using a GIS application tool having a review project template provided therein as described above in connection with FIGS. 1A-5. The maps having the incorporated boundary changes can be provided to an intranet site of the insurer for further review and/or analysis associated with the review process.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for geographic mapping and review, comprising:
    at least one computing device that provides a project template within a geographic information system (GIS) application, the project template associated with an actuarial review process and including:
        a number of selectable workspace pages configured to display a map content associated with a particular geographic region based on activation of one or more selectable map attributes associated with each of the number of selectable workspace pages, the map content including a geographic region of business of a first entity and a second entity and an identification of the first entity and the second entity, wherein the first entity and the second entity are in a same field of business; and
        a number of selectable layout pages configured to display the map content of a particular one of the number of selectable workspace pages along with other map information in a particular arrangement upon selection, wherein the map information includes boundary data associated with a risk assessment of the first entity and the second entity, wherein a first selectable layout page is configured to display the map information of the particular one of the number of selectable workspace pages corresponding to a first geographic region, and wherein a second selectable layout page is configured to display the map information of the particular one of the number of selectable workspace pages corresponding to a second geographic region different than the first geographic region, and wherein a type of map information displayed on the first selectable layout page is consistent with a type of map information displayed on the second selectable layout page;
    at least one computing device that opens a project within the GIS application using the project template, wherein the project includes an analysis of risk associated with the first entity versus the second entity in the first geographic region and the second geographic region; and
    at least one computing device that prepares the project for actuarial review.

2. The system of claim 1, wherein the at least one computing device that prepares the project for actuarial review is operable to select a particular workspace page of the number of selectable workspace pages.

3. The system of claim 2, including one or more selectable map attributes added to the particular workspace page, the one or more selectable map attributes each corresponding to a separate data file.

4. The system of claim 3, including an attribute identifier associated with each of the added selectable map attributes displayed within a display window of the particular workspace page.

5. The system of claim 1, including a subsystem operable to:
    provide the project to an actuarial reviewer for analysis;
    receive an adjustment to the map content of the particular workspace page from the actuarial reviewer; and
    incorporate the adjustment to the map content of the particular workspace page into the project to provide an adjusted map content of the particular workspace page.

6. The system of claim 5, including a map of the particular region created by selecting a particular layout page of the number of selectable layout pages to display the adjusted map content of the particular workspace page.

7. The system of claim 1, including the number of selectable layout pages configured according to a particular standardization associated with the map content of the particular one of the number of selectable workspace pages.

8. A method for geographic mapping and review, comprising:
    providing a project template within a geographic information system (GIS) application, the project template associated with an actuarial review process and including:
        a number of selectable workspace pages configured to display as map content associated with a particular geographic region based on activation of one or more selectable map attributes associated with each of the number of selectable workspace pages, the map content including a geographic region of business of as first entity and a second entity and an identification of the first entity and the second entity, wherein the first entity and the second entity are in a same field of business; and
        a number of selectable layout pages configured to display the map content of a particular one of the number of selectable workspace pages along with other map information in a particular arrangement upon selection, wherein the map information includes boundary data associated with a risk assessment of the first entity and the second entity, wherein a first selectable layout page is configured to display the map information of the particular one of the number of selectable workspace pages corresponding to as first geographic region, and wherein a second selectable layout page is configured to display the map information of the particular one of the number of selectable workspace pages corresponding to a second geographic region different than the first geographic region, and wherein a type of map information displayed on the first selectable layout page is consistent with a type of map information displayed on the second selectable layout page;

opening a project within the GIS application using the project template, wherein the project includes an analysis of risk associated with the first entity versus the second entity in the first geographic region and the second geographic region; and preparing the project for actuarial review.

9. The method of claim 8, where preparing the project for actuarial review includes selecting a particular workspace page of the number of selectable workspace pages.

10. The method of claim 9, including adding one or more selectable map attributes to the particular workspace page, the one or more selectable map attributes each corresponding to a separate data file.

11. The method of claim 10, including displaying an attribute identifier associated with each of the added selectable map attributes within a display window of the particular workspace page.

12. The method of claim 8, including:
providing the project to an actuarial reviewer for analysis;
receiving an adjustment to the map content of the particular workspace page from the actuarial reviewer; and
incorporating the adjustment to the map content of the particular workspace page into the project to provide an adjusted map content of the particular workspace page.

13. The method of claim 12, including creating a map of the particular region by selecting a particular layout page of the number of selectable layout pages to display the adjusted map content of the particular workspace page.

14. The method of claim 8, including configuring the number of selectable layout pages according to a particular standardization associated with the map content of the particular one of the number of selectable workspace pages.

15. A non-transitory computer readable medium having instructions stored thereon that can be executed by a computing device to:
provide a project template within a geographic information system (GIS) application, the project template associated with an actuarial review process and including:
a number of selectable workspace pages configured to display a map content associated with a particular geographic region based on activation of one or more selectable map attributes associated with each of the number of selectable workspace pages, the map content including a geographic region of business of a first entity and a second entity and an identification of the first entity and the second entity, wherein the first entity and the second entity are in a same field of business; and
a number of selectable layout pages configured to display the map content of a particular one of the number of selectable workspace pages along with other map information in a particular arrangement upon selection, wherein the map information includes boundary data associated with as risk assessment of the first entity and the second entity, wherein a first selectable layout page is configured to display the map information of the particular one of the number of selectable workspace pages corresponding to a first geographic region, and wherein a second selectable layout page is configured to display the map information of the particular one of the number of selectable workspace pages corresponding to a second geographic region different than the first geographic region, and wherein a type of map information displayed on the first selectable layout page is consistent with a type of map information displayed on the second selectable layout page;

open a project within the GIS application using the project template, wherein the project includes an analysis of risk associated with the first entity versus the second entity in the first geographic region and the second geographic region; and prepare the project for actuarial review.

16. The non-transitory computer readable medium of claim 15, where the instructions executed to prepare the project for actuarial review include instructions executed to select a particular workspace page of the number of selectable workspace pages.

17. The non-transitory computer readable medium of claim 16, including instructions executed to add one or more selectable map attributes to the particular workspace page, the one or more selectable map attributes each corresponding to a separate data file.

18. The non-transitory computer readable medium of claim 17, including instructions executed to display an attribute identifier associated with each of the added selectable map attributes within a display window of the particular workspace page.

19. The non-transitory computer readable medium of claim 15, including instructions executed to:
provide the project to an actuarial reviewer for analysis;
receive an adjustment to the map content of the particular workspace page from the actuarial reviewer; and
incorporate the adjustment to the map content of the particular workspace page into the project to provide an adjusted map content of the particular workspace page.

20. The non-transitory computer readable medium of claim 19, including instructions executed to create a map of the particular region by selecting a particular layout page of the number of selectable layout pages to display the adjusted map content of the particular workspace page.

21. The non-transitory computer readable medium of claim 15, including instructions executed to configure the number of selectable layout pages according to a particular standardization associated with the map content of the particular one of the number of selectable workspace pages.

* * * * *

UNITED STATES PATENT AND TRADEMARK OFFICE
CERTIFICATE OF CORRECTION

PATENT NO.         : 8,775,960 B1                                    Page 1 of 1
APPLICATION NO.    : 12/045474
DATED              : July 8, 2014
INVENTOR(S)        : Dawn E. Flores It is certified that error appears in the above-identified patent and that said Letters Patent is hereby corrected as shown below:

In the Claims:

Column 14, Line 40, In Claim 8, delete "as" and insert -- a --

Column 14, Line 44, In Claim 8, delete "as" and insert -- a --

Column 14, Line 58, In Claim 8, delete "as" and insert -- a --

Column 15, Line 54, In Claim 15, delete "as" and insert -- a --

Signed and Sealed this
Seventh Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,775,960 B1 | Page 1 of 1 |
| APPLICATION NO. | : 12/045474 | |
| DATED | : July 8, 2014 | |
| INVENTOR(S) | : Flores | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1604 days.

Signed and Sealed this
Fifteenth Day of March, 2016

Michelle K. Lee
*Director of the United States Patent and Trademark Office*